(12) United States Patent
Bachmaier et al.

(10) Patent No.: US 11,850,731 B2
(45) Date of Patent: Dec. 26, 2023

(54) ROBOT UNIT HAVING SEPARATE ACTUATORS AND A COMMON COUNTER ACTUATOR DEVICE FOR MULTIPLE MEMBERS

(71) Applicant: Siemens Aktiengesellschaft, Munich (DE)

(72) Inventors: Georg Bachmaier, Munich (DE); Christian Bachmann, Munich (DE); Guillaume Pais, Munich (DE); Iason Vittorias, Munich (DE); Wolfgang Zöls, München-Lochhausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 558 days.

(21) Appl. No.: 16/489,116

(22) PCT Filed: Feb. 8, 2018

(86) PCT No.: PCT/EP2018/053166
§ 371 (c)(1),
(2) Date: Aug. 27, 2019

(87) PCT Pub. No.: WO2018/158060
PCT Pub. Date: Sep. 7, 2018

(65) Prior Publication Data
US 2019/0389079 A1    Dec. 26, 2019

(30) Foreign Application Priority Data

Feb. 28, 2017    (DE) .................. 10 2017 203 237.5

(51) Int. Cl.
*B25J 15/00*    (2006.01)
*B25J 9/10*    (2006.01)

(52) U.S. Cl.
CPC ........... *B25J 15/0009* (2013.01); *B25J 9/104* (2013.01)

(58) Field of Classification Search
CPC .... B25J 15/0009; B25J 9/104; B25J 15/0023; B25J 15/12; B25J 15/0019; B25J 15/04;
(Continued)

(56) References Cited

U.S. PATENT DOCUMENTS

| 5,762,390 A | 6/1998 | Gosselin et al. ............ 294/106 |
| 9,016,744 B2 * | 4/2015 | Starkey .................. A61F 2/70 294/111 |

(Continued)

FOREIGN PATENT DOCUMENTS

| CN | 101622107 A | 1/2010 | ............ B25J 9/10 |
| CN | 101919755 A | 12/2010 | ............ A61F 2/54 |

(Continued)

OTHER PUBLICATIONS

Palli, Gianluca et al., "Modeling, Identification, and Control of Tendon-Based Actuation Systems," IEEE Transactions on Robotics, IEEE Service Center, Piscataway, NJ, US, vol. 28, No. 2, pp. 277-290 (figures 1, 2, pp. 278, right col. last paragraph), Apr. 2012.

(Continued)

*Primary Examiner* — Zakaria Elahmadi
(74) *Attorney, Agent, or Firm* — Slayden Grubert Beard PLLC

(57) ABSTRACT

Various embodiments include a robot unit for a technical apparatus comprising: a base connecting the robot unit to the technical apparatus; a first member pivot-mounted on the base; and a second member pivot-mounted on the base or the first member. The first member and the second member are each movable in one direction relative to a degree of freedom by a separate actuator. The first member and the second member are only movable together counter to the
(Continued)

direction relative to the degree of freedom by a single counter actuator device.

12 Claims, 1 Drawing Sheet

(58) Field of Classification Search
CPC ...... B25J 15/0293; B25J 15/08; B25J 15/086; B25J 15/10
See application file for complete search history.

(56) References Cited

U.S. PATENT DOCUMENTS

| | | | | |
|---|---|---|---|---|
| 2009/0314119 | A1 | 12/2009 | Knoll | 74/490.11 |
| 2010/0259057 | A1* | 10/2010 | Madhani | B25J 15/0009 294/106 |
| 2010/0312363 | A1 | 12/2010 | Herr et al. | 623/39 |
| 2011/0040408 | A1* | 2/2011 | De La Rosa Tames | B25J 9/1045 700/258 |

FOREIGN PATENT DOCUMENTS

| | | | | |
|---|---|---|---|---|
| CN | 105583838 | A | 5/2016 | ............ B25J 15/02 |
| DE | 447312 | C | 7/1927 | ............ A61F 2/58 |
| DE | 197 55 465 | A1 | 6/1999 | ............ A61F 2/58 |
| EP | 2 239 106 | A1 | 10/2010 | ............ A61F 2/54 |
| JP | 2005271183 | A | 10/2005 | ............ A63H 11/00 |
| JP | 2008-032140 | A | 2/2008 | ............ B25J 15/08 |
| WO | WO-2013087790 | A1 * | 6/2013 | ............ B25J 9/104 |
| WO | 2015/063523 | A2 | 5/2015 | ............ B25J 15/00 |
| WO | WO-2015169886 | A1 * | 11/2015 | ......... B25J 15/0009 |
| WO | 2018/158060 | A1 | 9/2018 | ............ B25J 15/00 |

OTHER PUBLICATIONS

German Office Action, Application No. 10 2017 203 237.5, 7 pages, dated Oct. 27, 2017.
International Search Report and Written Opinion, Application No. PCT/EP2018/053166, 21 pages, dated May 14, 2018.
Chinese Office Action, Application No. 201880014607.1, 24 pages, dated Mar. 1, 2022.

* cited by examiner

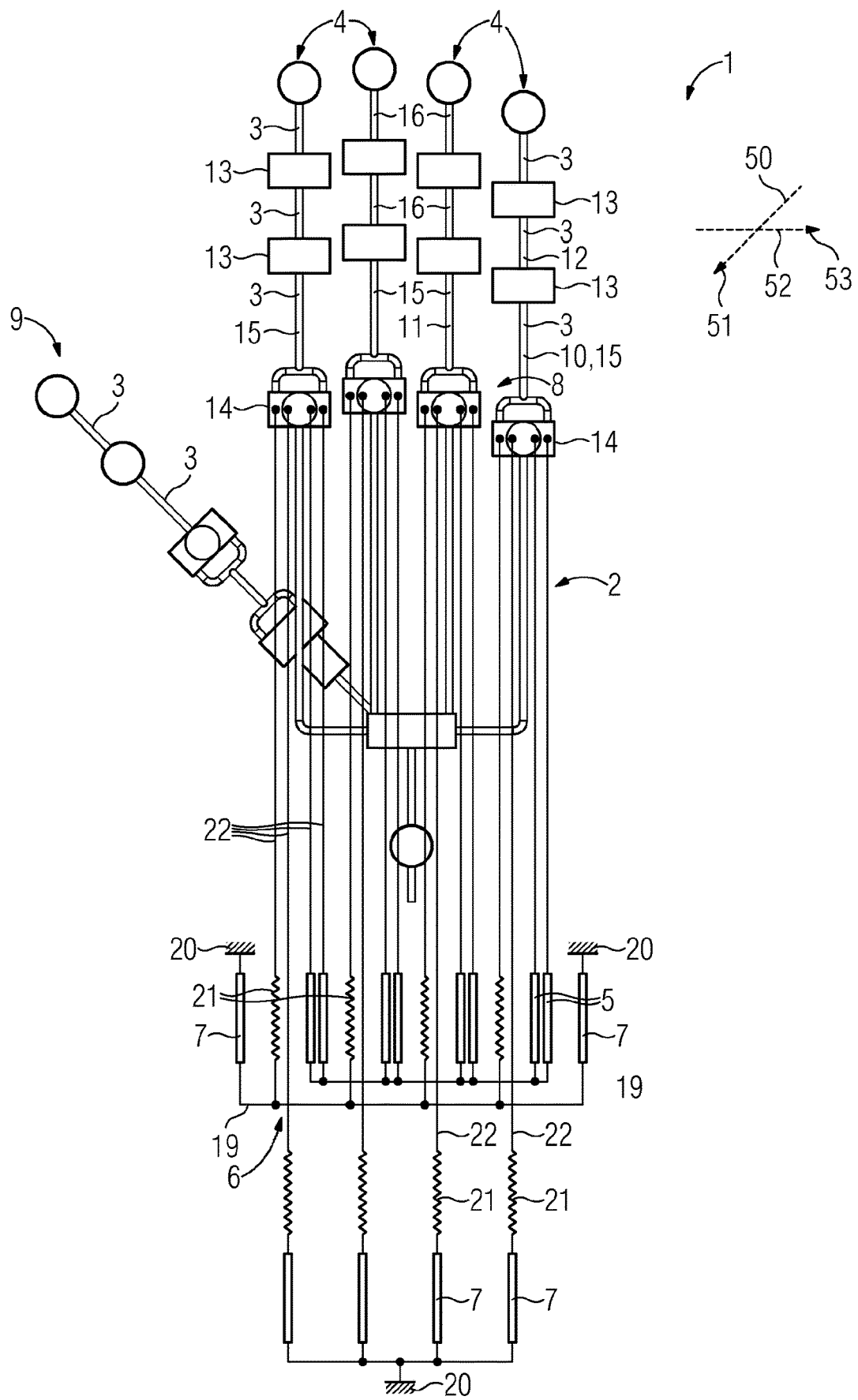

ROBOT UNIT HAVING SEPARATE ACTUATORS AND A COMMON COUNTER ACTUATOR DEVICE FOR MULTIPLE MEMBERS

CROSS-REFERENCE TO RELATED APPLICATIONS

This application is a U.S. National Stage Application of International Application No. PCT/EP2018/053166 filed Feb. 8, 2018, which designates the United States of America, and claims priority to DE Application No. 10 2017 203 237.5 filed Feb. 28, 2017, the contents of which are hereby incorporated by reference in their entirety.

TECHNICAL FIELD

The present disclosure relates to robots. Various embodiments may include robot units for technical apparatus having two pivot-mounted members which are each movable in one direction relative to a degree of freedom by means of a separate actuator.

BACKGROUND

Since adaptable and diversified technical apparatus, particularly for production, require much dexterity from robot units in the manipulating of workpieces, the often actuated robot units, particularly robot hands, are widely used at present. In order to assure a compact design for the robot unit, a drive in the manner of a cable pull may be used for movable elements of the robot unit. Because the actuators are not directly arranged on the movable parts, a particularly compact design is possible for the movable parts, which are configured in particular as members. A knee prosthesis having two drive units arranged by a spring on a knee joint is known for example from US 2010/031 23 63.

In the prior art it is customary to employ two drive units for each degree of freedom of a member, particularly an actuator and a counter actuator. The actuator and the counter actuator are drive units by means of which the member can be moved in contrary directions. This can also be called an agonist/antagonist arrangement of the drive units.

In a robot unit with many movable parts, particularly many members, there may be needed many drive units in order to move all the members independently in each direction. This is also known as a complete actuation. For example, for a robot unit designed as a robot hand and preferably modeled on the human hand, 48 drive units are needed, in particular 24 actuators and 24 counter actuators, in order to make possible a complete actuating of all degrees of freedom of all the members.

In order to reduce the number of drive units, the prior art offers the possibility of replacing counter actuators with passive elements, particularly elastic elements like rubber or springs. In this case, only a single drive unit is needed per degree of freedom. A movement contrary to the individual drive unit can be done by tension energy stored in the passive element. The remaining drive unit, particularly the actuator, must be designed to be more powerful in this case, since the remaining drive unit must, at the same time as a movement force in order to move the member, also overcome a resistance force of the passive element. Thus, a portion of the driving force of the remaining drive unit is lost in the passive element.

An alternative option is to couple degrees of freedom of different members with each other. This is also known as under-actuating. In this case, for example one actuator and one counter actuator are provided for two members together. But the dexterity of the robot unit decreases greatly by sacrificing degrees of freedom in the movement of the robot unit.

SUMMARY

The problem which the teachings of the present disclosure proposes to solve is to decrease the number of drive units for the members of a robot unit as compared to a complete actuating. For example, some embodiments include a robot unit (1) for a technical apparatus, having a base (2) by which the robot unit (1) can be arranged on the technical apparatus, and having a first member (10), which is pivot-mounted on the base (2), and a second member (11), which is pivot-mounted on the base (2) or the first member (10), wherein the first member (10) and the second member (11) are each movable in one direction (53) relative to a degree of freedom (50) by means of a separate actuator (5), characterized in that the first member (10) and the second member (11) are only movable together counter to the direction (53) relative to the degree of freedom (52) by means of a single counter actuator device (6).

In some embodiments, the actuators (5) are designed to move the first member (10) and the second member (11) as claimed in the same degree of freedom (50) respectively in the same direction (51).

In some embodiments, there is, besides the first member (10) and the second member (11), at least one further member (3), and all members (3) are movable only in common by the counter actuator device (6).

In some embodiments, the actuators (5) are designed to move the members (3) in such a way that a bending angle between the first member (10) and the base (2) and between the second member (11) and the first member (10) or the base (2) is decreased.

In some embodiments, each member (3) comprises a respective actuator (5), and for each of the degrees of freedom (50, 52) only a single counter actuator device (6) is present for the respective common movement of all the members (3).

In some embodiments, the robot unit (1) is designed as a robot hand (8), wherein the robot unit (1) comprises multiple fingers (4), which are arranged on the base (2), wherein each of the fingers (4) comprises multiple members (3), of which the first member (10) and the second member (11) form identical finger parts of different fingers (4).

In some embodiments, all members (3) respectively forming identical finger parts of different fingers (4) are individually movable only in common by the counter actuator device (6) and individually by respective actuators (5).

In some embodiments, the counter actuator device (6) comprises an arrangement of two coupled counter actuators (7).

In some embodiments, the actuator (5) and the counter actuator device (6) are connected by respective connection elements (22) to the first member (10) and the second member (11).

In some embodiments, the respective connection elements (22) are designed as a cable pull.

In some embodiments, each connection element (22) comprises an elastic element (21).

In some embodiments, the actuators (5) and the counter actuator device (6) are designed to move the members (3) by means of a drive force transmitted by means of the respective connection elements (22), particularly exclusively in this way.

In some embodiments, the robot hand (8) is modeled on a human hand in terms of its mobility and number of members (3).

BRIEF DESCRIPTION OF THE DRAWINGS

The single FIGURE shows a robot unit 1 incorporating teachings of the present disclosure in a schematic front view.

DETAILED DESCRIPTION OF THE DRAWINGS

In some embodiments, a robot unit for a technical apparatus comprises a base by which the robot unit can be arranged on the technical apparatus. The robot unit further comprises a first member, which is pivot-mounted on the base, and a second member, which is pivot-mounted on the base or the first member. The first member and the second member are each movable in one direction relative to a degree of freedom by means of a separate actuator. In particular, the first member can pivot in one direction relative to the base by means of a first of the separate actuators. In particular, the second member can pivot relative to the base and/or the first member by means of a second of the separate actuators.

Now, in order to reduce the number of drive units as compared to a complete actuating, the first member and the second member are only movable together counter to the direction relative to the degree of freedom by means of a single counter actuator device. For example, the counter actuator device comprises precisely one counter actuator. In particular, the first member and the second member are able to move independently of each other in the direction because of the separate actuators with regard to the degree of freedom. Thanks to the single counter actuator device, the first member and the second member can only move jointly against the direction with regard to the degree of freedom. The actuators as well as the counter actuator device, particularly the counter actuator, may be viewed as drive unit for the members. For example, the actuators and/or the counter actuator device, particularly the counter actuator, comprise an electrical, pneumatic or hydraulic drive. The electrical drive may comprise an electric motor, such as a rotation motor or a linear motor. The degree of freedom of the first member and the degree of freedom of the second member, relative to which the respective member of the respective actuator is movable, may be different.

In some embodiments, the actuators may be designed to move the first member and the second member according to the same degree of freedom respectively in the same direction. In other words, the respective actuators may be designed to swivel the first member and the second member with regard to a predetermined spatial direction as the degree of freedom, where the spatial direction for the first member in particular corresponds to the spatial direction for the second member.

In some embodiments, the respective actuators are designed to swivel the first member and the second member with respect to the spatial direction in the same direction. The counter actuator device may be designed to move the first member and the second member in the opposite direction with regard to the predetermined spatial direction, in particular with respect to the direction of the actuators. In some embodiments, it is possible to move the first member and the second member in the direction independently of each other with regard to the degree of freedom and thereby make possible a good dexterity of the robot unit with respect to the degree of freedom in this direction. Contrary to the direction with respect to the degree of freedom, the number of counter actuators may be reduced, while also reducing the dexterity of the robot unit. The direction with respect to the degree of freedom in which the first member and the second member are independently movable by the separate actuators is oriented in particular such that it corresponds to a direction in which a greater degree of dexterity is required as compared to the contrary direction.

In some embodiments, the robot unit comprises, besides the first member and the second member, at least one further member, and all members may be movable only together by the counter actuator device. The counter actuator device may comprise one or more counter actuators. In some embodiments, the number of counter actuators comprised by the counter actuator device is less than the number of actuators. In particular, the number of actuators may correspond to the number of members. The number of counter actuators comprised by the counter actuator device is in particular less than the number of members.

In some embodiments, the actuators may be designed to move the members in such a way that a bending angle between the first member and the base and between the second member and the first member or the base is decreased. In some embodiments, the respective bending angles lie on the same side of the members or of the robot unit. In some embodiments, the respective bending angles lie on the same side of a plane running parallel to the base. In some embodiments, the decreasing of the bending angle between the first member and the base and between the second member and the first member or the base is a closing movement, e.g. a grasping movement. In some embodiments, by decreasing the bending angle it is possible for an object to be grasped by the robot unit. The movement of the first member and the second member during which the respective bending angles are decreased may involve a movement requiring a higher degree of dexterity than a movement of the first member and the second member during which the bending angle is increased. Therefore, the first member and the second member may be independently movable by the separate actuators when the bending angle is decreased.

In some embodiments, each member comprises a respective actuator, and for each of the degrees of freedom only a single counter actuator device is present for the respective common movement of all the members. The counter actuator device may comprise one or more counter actuators. In some embodiments, the number of counter actuators comprised in the counter actuator device is less than the number of members.

In some embodiments, the robot unit may be designed as a robot hand, wherein the robot unit comprises multiple fingers, which are arranged on the base, wherein each of the fingers comprises multiple members, of which the first member and the second member form identical finger parts of different fingers. Members forming identical finger parts are arranged in particular by the same number of further members on the base. In some embodiments, the first member and the second member are directly pivot-mounted on the base.

In some embodiments, the first member and the second member are arranged by a respective further member on the base. For example, the first member and the second member represent identical finger parts of different fingers. In some embodiments, the robot unit comprises multiple identical fingers, e.g. four. In addition, the robot unit may comprise a further finger, particularly a fifth one, which is different from the other fingers.

In a robot unit which is designed as a robot hand it may be useful to move the members by means of a single counter actuator device contrary to the direction with regard to the degree of freedom. In some embodiments, it is possible in this way to spare several counter actuators as compared to the prior art. Since the multiple fingers may have identical mobility, for example they can swivel in the same spatial direction, a loss in dexterity of the robot unit by sacrificing drive units as compared to the prior art can be reduced.

In some embodiments, all members respectively form identical finger parts of different fingers to be movable only in common by the counter actuator device and individually by respective actuators. In other words, the members forming the identical finger parts of different fingers are movable independently of each other in the direction relative to the degree of freedom by separate actuators. Regarding the degree of freedom in the contrary direction, the members forming identical finger parts of different fingers are only movable by the counter actuator device, particularly only in common. In some embodiments, the members are individually movable by the respective actuators with regard to the degree of freedom in the direction in which a bending angle between members of fingers among each other and/or relative to the base is decreased.

In particular, the fingers or the members of the fingers can be angled or moved into an angled posture independently of each other by the respective actuators. This is also known as "flexion". The multiple fingers or their members may be stretched out or moved into a stretched-out position by the counter actuator device. This is also known as "extension". In some embodiments, the robot unit is designed such that the fingers or their members are movable independently of each other by the respective actuators during a grasping movement by the robot unit and/or during a closing of the robot hand. In particular, the fingers or their members are only movable in common by the counter actuator device during an opening of the robot hand.

In some embodiments, the counter actuator device to comprise an arrangement of two coupled counter actuators. For example, the coupled counter actuators are connected by a connection, such as a rod. For example, multiple members which are movable by the counter actuator device are arranged at different fastening points of the connection means. In this way, despite having a single counter actuator device for the joint movement of the fingers, they may still be at least partly movable in different ways. As a result, the loss of dexterity due to the single counter actuator device can be particularly slight.

In some embodiments, the actuator and the counter actuator device may be connected by respective connection elements to the first member and the second member. In particular, the respective actuator and/or the counter actuator device are not arranged directly on the first member and/or the second member. The respective connection elements may be designed to transmit a driving force from the actuator and the counter actuator device to the first member and the second member. In some embodiments, two connection elements are arranged on each of the members, where a first of the connection elements is connected to the actuator and a second of the connection elements is connected to the counter actuator device. Thanks to the spatial separation between members and drive unit, a particularly compact design is possible for the robot unit and/or the fingers.

In some embodiments, the respective connection elements may be designed as a cable pull. For example, the driving force of the actuator and/or the counter actuator device can be transmitted by means of a cable to the member. The cable may be simply deflected about an axis, for example about deflection rollers or edges. The cable pull enables a particularly simple and space-saving form of force transmission. One cable of the cable pull may only transmit the driving force in tension. Thus, it is only possible to transmit the driving force of the actuator and/or the counter actuator device in one direction. In some embodiments, for this reason each of the members is only movable respectively in one direction by means of the actuator and the counter actuator device.

In some embodiments, each connection element comprises an elastic element. In some embodiments, connection elements which are arranged on the counter actuator device may comprise the elastic element. In this case, the connection elements of the counter actuator device may also be held under tension when the respective actuators move the first member and the second member into a different position.

In some embodiments, the actuators and the counter actuator device may be designed to move the members by means of a drive force transmitted by means of the respective connection elements, particularly exclusively in this way. The members may comprise a joint, for example, by which they are arranged on another of the members or on the base. The driving force from the actuator or the counter actuator device may thus be converted into the movement at the member.

In some embodiments, the robot hand may be modeled on a human hand in terms of its mobility and number of members. For example, the robot hand comprises four fingers oriented along the same spatial direction, each consisting of three members. In addition, the robot hand may comprise the additional finger, which is oriented along a further spatial direction and which comprises two members, for example. For example, the fingers or the individual members may be movable in an angle range of 90° to 180° relative to an adjacent member of the same finger. For example, the member of each finger arranged directly on the base can pivot in an angle range of 90° to 180° relative to the base. In this case, a particularly intuitive control of the robot unit is made possible, since it imitates a movement of the human hand. For example, the individual fingers of the human hand usually are not movable entirely independently of each other.

A further aspect of the teachings herein relates to a technical apparatus having a robot unit of the above-mentioned kind. The robot unit is arranged via the base on another component of the technical apparatus. For example, the technical apparatus is part of a manufacturing line or a manufacturing apparatus for the production of products.

The single FIGURE shows a robot unit 1 in a schematic front view. The robot unit 1 is designed as a robot hand 8 and in the present case it comprises four fingers 4, which are pivot-mounted on a base 2. Each of the fingers 4 comprises three members 3 in the present case. The robot unit 1 in the present case also comprises a fifth finger 9, having two members 3. The robot unit 1 or robot hand 8 is modeled on a human hand with regard to its mobility and the number of members 3. In particular, the other fingers represent other fingers of the human hand. In particular, the fifth finger 9 represents the thumb of the human hand.

Each of the members 3 is pivot-mounted on the base 2 or on a further one of the members 3. In some embodiments, lower members 15 are pivot-mounted on the base 2. In the present case, the lower members 15 are mounted via a joint unit 14 on the base 2. In particular, the joint units 14 are part of the lower members 15. A first member 10 may be pivot-mounted on the base 2. A second member 11 may be pivot-mounted on the base 2. A further second member 12 may be pivot-mounted on the first member 10. Upper members 16 in the present case are pivot-mounted on one of the members 3. In particular, the upper members 16 are mounted via further joint units 13 respectively on one of the lower members 15 or a further one of the upper members 16. A further second member 12 can be pivot-mounted on the first member 10.

The members 3 can be movable by respective actuators 5 and counter actuators 7. One or more of the counter actuators 7 may form a counter actuator device 6. In the present case, for this purpose two of the counter actuators 7 are assembled by a connection 19, such as a rod or any given component, to form the counter actuator device 6. The counter actuator device 6 may alternatively comprise precisely one counter actuator 7. For example, the actuators 5 and the counter actuators 7 are designed as an electrical, pneumatic, piezohydraulic or hydraulic drive. The electrical drive may be designed as an electric motor, such as a rotation motor or as a linear motor.

In particular, each of the members 3 is connected by a respective connection element 22 to a respective actuator 5. In addition, each of the members 3 is connected by a connection element 22 to one of the counter actuators 7 or to the counter actuator device 6. Actuators 5, counter actuators 7 and connection elements 22 are represented in the FIGURE only for the lower members 15 or the joint units 14 of the lower members 15 for reasons of an uncluttered drawing. The connection elements 22 are respectively designed in the manner of a cable pull. Each of the connection elements 22 or certain connection elements 22 may comprise a respective elastic element 21.

Each of the lower members 15 is movable in a direction 51 relative to a first degree of freedom 50 by a separate actuator 5. In the present case, each of the lower members 15 is movable by a separate actuator 5 relative to a second degree of freedom 52, particularly independently of other of the lower members 15, in a direction 53. In the present case, each of the lower members 15 is connected to two respective actuators 5, each of the two actuators 5 making possible the movement relative to a respective degree of freedom 50, 52. Regarding the second degree of freedom 52, each of the lower members 15 in the present case is movable contrary to the direction 53 by means of a separate counter actuator 7. The lower members 15 may be movable independently with regard to the second degree of freedom 52 both in the direction 53 and contrary to the direction 53. The lower members 15 in the present case are only movable in common contrary to the direction 51 relative to the degree of freedom 50 by means of the counter actuator device 6. Thus, the number of counter actuators 7 is decreased as compared to a complete actuating of the robot unit 1.

The fingers 4 in the present case are thus movable by the counter actuator device 6 in the first degree of freedom 50 contrary to the direction 51, so that the robot hand 8 performs an opening movement ("extension"). In particular, for the opening movement there may be provided an increasing of the angle, preferably on the inside of the robot hand 8, between two adjacent members 3. In particular, for the opening movement there may be provided an increasing of the angle, preferably on the inside of the robot hand 8, between one of the lower members 15 and the base 2. During the opening movement, the lower members 15 in the present case are only movable in common by the counter actuator device 6. Because the lower members 15 during the opening movement are only movable in common, the number of counter actuators 7 is reduced as compared to a complete actuating of the robot unit 1. The robot unit 1 is thus under-actuated. Because the counter actuator device 6 comprises two counter actuators 7, despite the under-actuating a different movement of the lower members 15 is made possible. In particular, different movements of the fingers 4 are made possible by a forward and/or contrary mobility of the counter actuators 7 comprised in the counter actuator device 6.

The fingers 4 in the present case are movable by the actuators 5 in the first degree of freedom 50 in the direction 51 so that the robot hand 8 performs a grasping movement ("flexion"). In particular, for the grasping movement there may be provided a decreasing of an angle, preferably on an inside of the robot hand 8, between two adjacent members 3. In particular, for the grasping movement there may be provided a decreasing of an angle, preferably on the inside of the robot hand 8, between one of the lower members 15 and the base 2. During the grasping movement, the lower members 15 in the present case are respectively movable individually and independently by the separate actuators 5. Thus, despite the under-actuating, good dexterity of the robot unit 1 is assured during the grasping movement.

Thanks to the respective elastic element 21, the connection elements 22 can always be held under tension. In particular, a tensioning of the connection elements 22 is also assured when a single one of the lower members 15 is being moved. Without the connection elements 22, a loss of tension may occur in this case, which the counter actuator device 6 cannot freely follow the motion of the actuator 5.

Because of the individual counter actuator device 6, from a movement in the first degree of freedom 50 contrary to the direction 51 of one of the fingers 4, a movement of adjacent fingers 4 in the first degree of freedom 50 can also always follow. For example, from a movement of the first member 10 there may follow a movement of all the fingers 4. Because the counter actuator device 6 comprises two counter actuators 7, the movement of further fingers 4 starting from the first member 10 can continually decrease with ever increasing distance.

The robot hand 8 is modeled on a human hand in terms of the number and mobility of the fingers 4. Adjacent fingers of the human hand cannot be movable entirely independently of each other. Thus, the mobility of the robot hand 8 preferably deviates only slightly from the mobility of the human hand, despite the under-actuating.

Those members 3 which are movable by a common counter actuator device 6 may be viewed as a group, particularly a synergistic group. Such groups may be formed at will among the members 3. In some embodiments, the members 3 of a group comprise a respective counter actuator device 6 for each of the degrees of freedom 50, 52. In some embodiments, the members 3 of a group comprise only one common counter actuator device 6 for several of the degrees of freedom 50, 52. In some embodiments, such groups can be formed for those of the members 3 which have a similar mobility. For example, in one extreme case, precisely one counter actuator device 6 may be provided for all the members 3. For example, members 3 respectively forming an identical finger part of the fingers 4 may form a group. For example, the lower members 15 respectively form an identical finger part of the fingers 4.

During the grasping movement, a larger force may be needed to move the members 3 than during the opening movement. In particular, therefore, despite the lower number of counter actuators 7 as compared to the number of actuators 5, a greater capacity of the counter actuators 7 as compared to the actuators 5 is not needed.

What is claimed is:

1. A robot unit for a technical apparatus, the robot unit comprising:
    a base connecting the robot unit to the technical apparatus; a first member pivot-mounted on the base; and
    a second member pivot-mounted on the base or the first member;
    a set of primary actuators, wherein the first member and the second member are each movable in one direction relative to a degree of freedom by a separate actuator of the set of actuators, wherein each one of the separate actuators acts on only one member; and
    a shared counter actuator device working on both the first member and the second member, wherein the first member and the second member only move together counter to the direction relative to the degree of freedom and are moved by the shared counter actuator device.

2. The robot unit as claimed in claim 1, wherein the actuators are configured to move the first member and the second member in the same degree of freedom respectively in the same direction.

3. The robot unit as claimed in claim 1, further comprising a further member;
    wherein all members are movable only in common by the counter actuator device.

4. The robot unit as claimed in claim 1, wherein the actuators are configured to move the members in such a way that a first bending angle between the first member and the base and a second bending angle between the second member and the first member or the base are both decreased.

5. The robot unit as claimed in claim 1, wherein:
    each member comprises a respective actuator; and
    for each degree of freedom, only a single counter actuator device is present for the respective common movement of all the members.

6. The robot unit as claimed in claim 1, wherein:
    the robot unit multiple fingers each arranged on the base; and
    each of the fingers comprises multiple members with a first member and a second member forming identical finger parts of different fingers.

7. The robot unit as claimed in claim 6, wherein all members respectively forming identical finger parts of different fingers are individually movable only in common by the counter actuator device and individually by respective actuators.

8. The robot unit as claimed in claim 7, wherein the counter actuator device comprises two coupled counter actuators.

9. The robot unit as claimed in claim 1, wherein the actuator and the counter actuator device are connected by respective connection elements to the first member and the second member.

10. The robot unit as claimed in claim 9, wherein the respective connection elements comprise a cable pull.

11. The robot unit as claimed in claim 9, wherein each connection element comprises a respective elastic element.

12. The robot unit as claimed in claim 10, wherein the actuators and the counter actuator device are configured to move the members with a drive force transmitted by the respective connection elements.

\* \* \* \* \*